(12) United States Patent
White, III (10) Patent No.: US 11,808,176 B2
(45) Date of Patent: Nov. 7, 2023

(54) CMC VANE SEALING ARRANGEMENT

(71) Applicant: Raytheon Technologies Corporation, Farmington, CT (US)

(72) Inventor: Robert A. White, III, Meriden, CT (US)

(73) Assignee: RTX CORPORATION, Farmington, CT (US)

( * ) Notice: Subject to any disclaimer, the term of this patent is extended or adjusted under 35 U.S.C. 154(b) by 35 days.

(21) Appl. No.: 17/307,106

(22) Filed: May 4, 2021

(65) Prior Publication Data

US 2022/0356809 A1  Nov. 10, 2022

(51) Int. Cl.
| F01D 9/04 | (2006.01) |
| F01D 9/02 | (2006.01) |
| F01D 11/00 | (2006.01) |
| F01D 11/08 | (2006.01) |
| F02C 7/28 | (2006.01) |

(52) U.S. Cl.
CPC .............. *F01D 9/042* (2013.01); *F01D 9/02* (2013.01); *F01D 11/005* (2013.01); *F01D 11/08* (2013.01); *F02C 7/28* (2013.01); *F05D 2220/32* (2013.01); *F05D 2240/55* (2013.01); *F05D 2240/56* (2013.01); *F05D 2240/81* (2013.01); *F05D 2260/201* (2013.01)

(58) Field of Classification Search
CPC ........ F01D 9/042; F01D 11/005; F01D 11/08; F05D 2240/81; F05D 2260/201
See application file for complete search history.

(56) References Cited

U.S. PATENT DOCUMENTS

| 5,407,319 | A | * | 4/1995 | Harrogate | ............. | F01D 11/005 |
| | | | | | | 415/115 |
| 8,096,758 | B2 | * | 1/2012 | Schiavo | .................... | F01D 9/04 |
| | | | | | | 415/200 |
| 8,292,573 | B2 | * | 10/2012 | Broomer | .................. | F01D 25/12 |
| | | | | | | 415/209.2 |
| 9,657,642 | B2 | | 5/2017 | Kanjiyani et al. | | |
| 9,995,157 | B2 | * | 6/2018 | Bangerter | ................. | F01D 9/02 |
| 10,738,620 | B2 | * | 8/2020 | Anderson | ................. | F01D 5/18 |
| 11,346,228 | B1 | * | 5/2022 | Burdette | .................. | D03D 1/00 |

(Continued)

FOREIGN PATENT DOCUMENTS

| EP | 3557001 | 10/2019 |
| EP | 3854994 | 7/2021 |

(Continued)

OTHER PUBLICATIONS

European Search Report for European Patent Application No. 22170311.9 dated Jan. 4, 2023.

(Continued)

*Primary Examiner* — Eldon T Brockman
(74) *Attorney, Agent, or Firm* — Carlson, Gaskey & Olds, P.C.

(57) ABSTRACT

A vane assembly includes an airfoil extending from a platform. The platform has a flange that extends radially outward and circumferentially across the platform. A vane cover is arranged adjacent the platform that defines an impingement gap between the platform and the vane cover. The vane cover has a wall that defines a slot. The flange is arranged at least partially within the slot.

22 Claims, 5 Drawing Sheets

(56) References Cited

U.S. PATENT DOCUMENTS

| | | | | |
|---|---|---|---|---|
| 2010/0054932 A1* | 3/2010 | Schiavo | ................... | F01D 9/04 |
| | | | | 415/200 |
| 2013/0011265 A1* | 1/2013 | Miller | ................... | F01D 11/008 |
| | | | | 416/191 |
| 2015/0285086 A1* | 10/2015 | Bangerter | ............... | F01D 25/12 |
| | | | | 415/115 |
| 2017/0292407 A1* | 10/2017 | Moga | ...................... | F01D 5/187 |
| 2020/0355086 A1* | 11/2020 | Camillieri | ............. | F01D 11/001 |
| 2021/0231024 A1* | 7/2021 | Whittle | ................... | F01D 11/08 |

FOREIGN PATENT DOCUMENTS

| | | |
|---|---|---|
| EP | 3892823 | 10/2021 |
| EP | 4047185 | 8/2022 |
| WO | 2019040291 | 2/2019 |

OTHER PUBLICATIONS

Partial European Search Report for European Patent Application No. 22170311.9 dated Sep. 27, 2022.

* cited by examiner

CMC VANE SEALING ARRANGEMENT

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor or turbine sections may include vanes mounted on vane platforms. Some vanes have been proposed made of ceramic matrix composite materials. Cooling and sealing such vanes may present challenges.

SUMMARY OF THE INVENTION

In one exemplary embodiment, a vane assembly includes an airfoil extending from a platform. The platform has a flange that extends radially outward and circumferentially across the platform. A vane cover is arranged adjacent the platform that defines an impingement gap between the platform and the vane cover. The vane cover has a wall that defines a slot. The flange is arranged at least partially within the slot.

In another embodiment according to any of the previous embodiments, the wall extends circumferentially across the vane cover.

In another embodiment according to any of the previous embodiments, the wall is configured to engage with a radially inwardly extending flange of an engine static structure.

In another embodiment according to any of the previous embodiments, a plurality of holes extend through the vane cover and are in fluid communication with the impingement gap.

In another embodiment according to any of the previous embodiments, the impingement gap is between about 0.020 and 0.050 inches (0.508-1.27 mm).

In another embodiment according to any of the previous embodiments, the vane cover has a raised perimeter on a radially outer side.

In another embodiment according to any of the previous embodiments, a second slot is arranged in a portion of the raised perimeter. A vertical featherseal is arranged in the second slot.

In another embodiment according to any of the previous embodiments, the vane cover has a protrusion that provides a seal land and is configured to be in contact with a plunger of a spring assembly mounted on an engine static structure.

In another embodiment according to any of the previous embodiments, a mateface seal is arranged on the platform at a circumferential edge.

In another embodiment according to any of the previous embodiments, a brush seal is arranged along at least one of a forward end and an aft end of the platform.

In another embodiment according to any of the previous embodiments, a baffle is welded to the vane cover to seal an airfoil shaped cavity.

In another embodiment according to any of the previous embodiments, the platform is formed from a ceramic matrix composite material.

In another embodiment according to any of the previous embodiments, the vane cover is formed from a metallic material.

In another exemplary embodiment, a gas turbine engine includes a compressor section. A combustor is in fluid communication with the compressor section. A turbine section is in fluid communication with the combustor. At least one of the turbine section or the compressor section includes a vane that has an airfoil and a platform. The platform has a flange that extends radially outward and circumferentially across the platform. A vane cover is arranged adjacent the platform. The vane cover has raised perimeter on a radially outer side. The vane cover defines an impingement gap between the platform and the vane cover within the raised perimeter.

In another embodiment according to any of the previous embodiments, a wall extends circumferentially across the vane cover. The wall is engaged with a first flange that extends radially inwardly from an engine static structure.

In another embodiment according to any of the previous embodiments, the wall defines a slot. The flange of the platform is arranged within the slot.

In another embodiment according to any of the previous embodiments, the engine static structure has a second radially inwardly extending flange forward of the first flange.

In another embodiment according to any of the previous embodiments, a plurality of holes extend through the vane cover and are in fluid communication with the impingement gap.

In another embodiment according to any of the previous embodiments, a mateface seal is arranged on the platform at a circumferential edge. A brush seal is arranged along at least one of a forward end and an aft end of the platform.

In another embodiment according to any of the previous embodiments, the platform is formed from a ceramic matrix composite material. The vane cover is formed from a metallic material.

The present disclosure may include any one or more of the individual features disclosed above and/or below alone or in any combination thereof.

DETAILED DESCRIPTION

Figure 1:
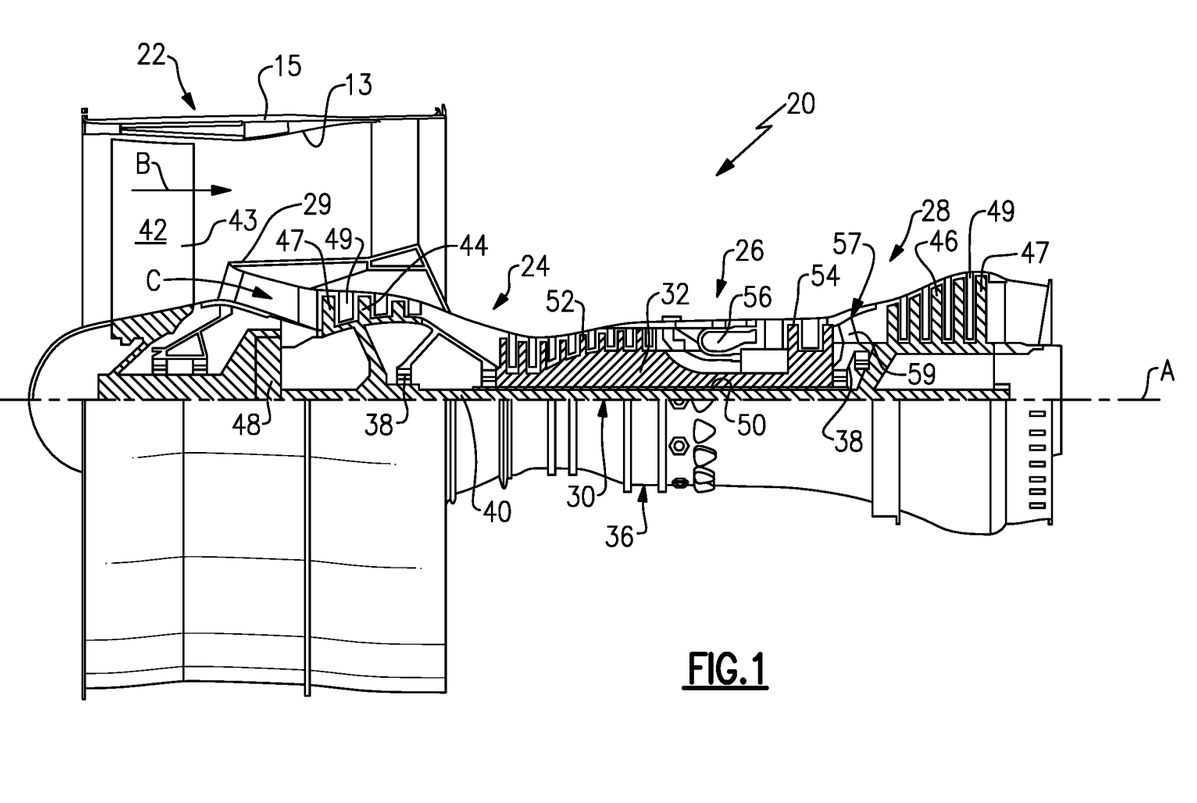
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

Figure 2:
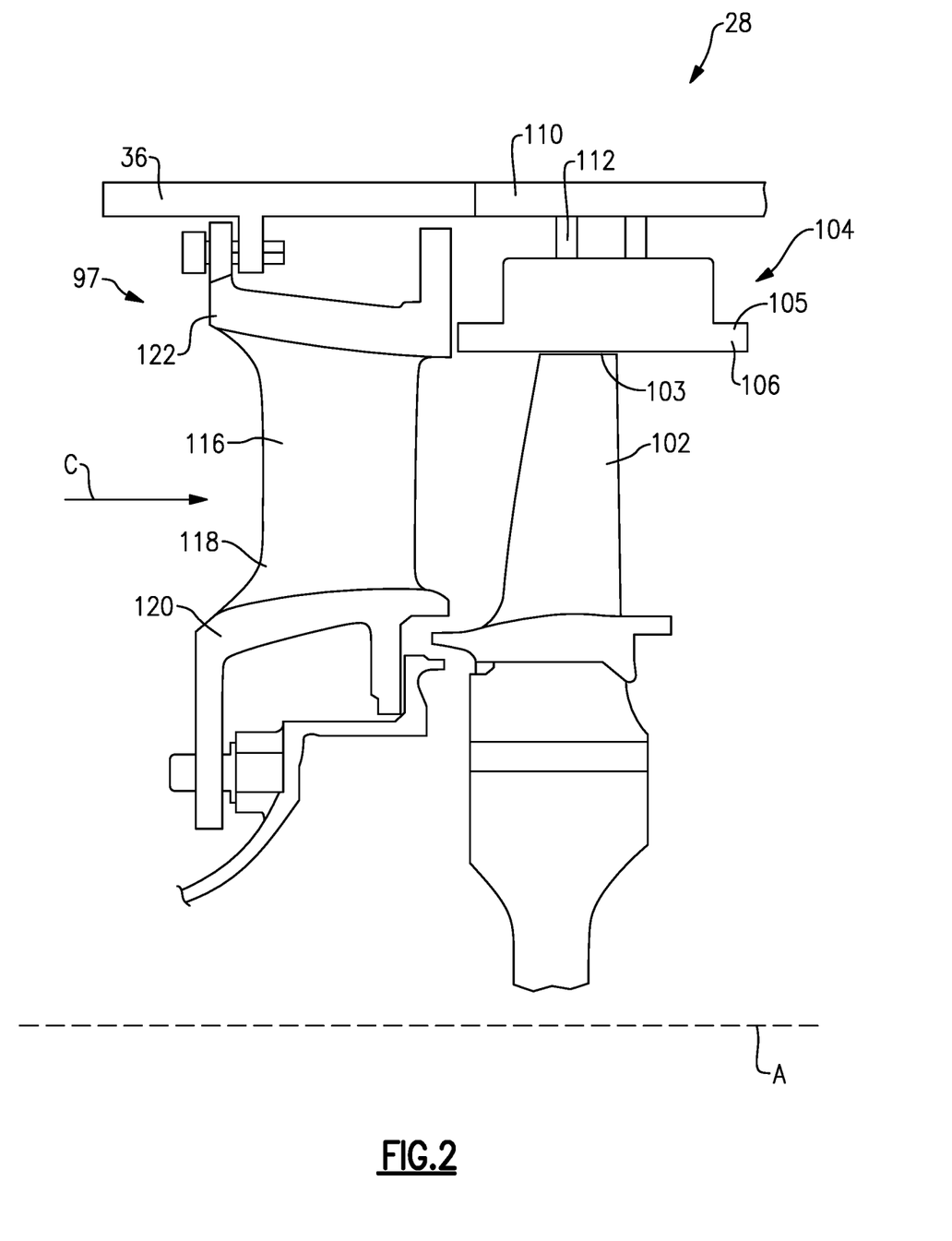
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be mounted to an engine case or structure, such as engine static structure 36 via a control ring or support structure 110 and a carrier 112. The engine structure 36 may extend for a full 360° about the engine axis A.

The turbine vane assembly 97 generally comprises a plurality of vane segments 118. In this example, each of the vane segments 118 has an airfoil 116 extending between an inner vane platform 120 and an outer vane platform 122. At least a portion of the outer vane platform 122 may be formed of a ceramic matrix composite material ("CMC") material. The outer vane platform 122 is formed of a plurality of CMC laminate sheets. The laminate sheets may be silicon carbide fibers, formed into a braided or woven fabric in each layer. In other examples, the outer vane platform 122 may be made of a monolithic ceramic. CMC components such as platforms 120, 122 are formed by laying fiber material, such as laminate sheets or braids, in tooling, injecting a gaseous or a melt infiltrant into the tooling, and reacting to form a solid composite component. The component may be further processed by adding additional material to coat the laminate sheets. CMC components may have higher operating temperatures than components formed from other materials. A radially stacked assembly may be arranged between the platform 122 and the engine static structure 36, as explained further herein.

Figure 3:
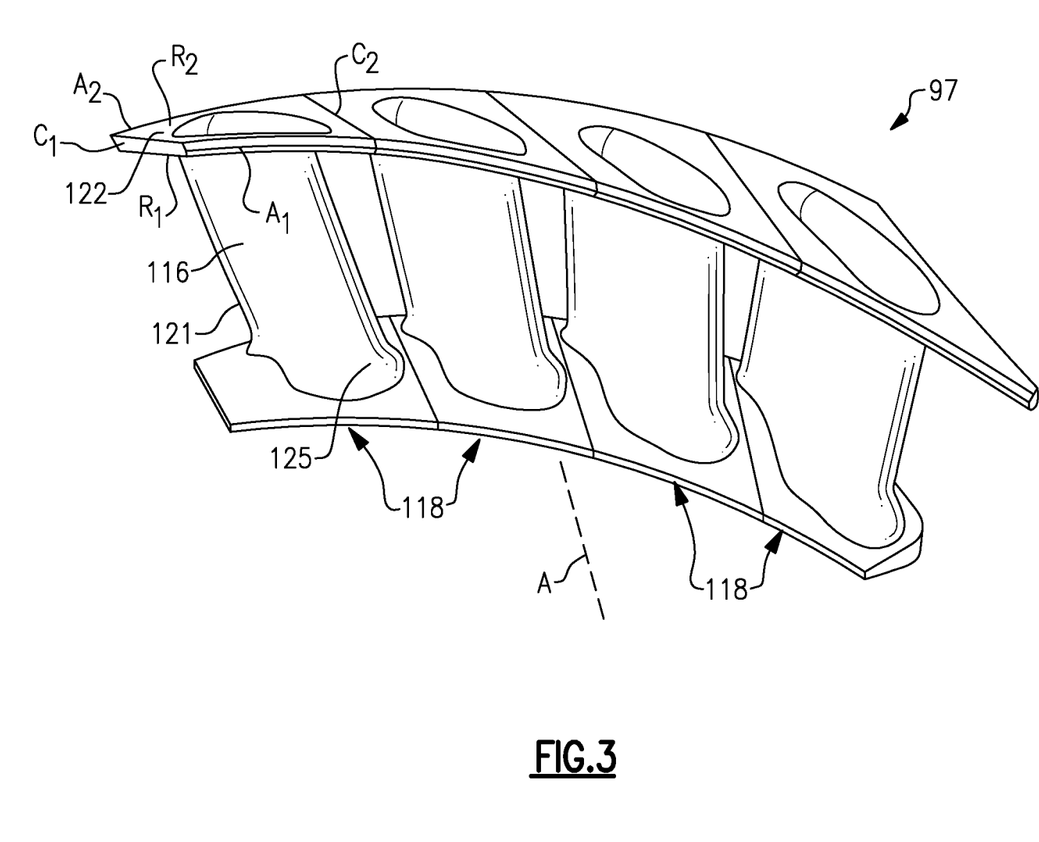
FIG. 3 schematically illustrates a portion of a vane ring assembly.

FIG. 3 illustrates a portion of the vane ring assembly 97 from the turbine section 28 of the engine 20. The vane ring assembly 97 is made up of a plurality of vanes 118 situated in a circumferential row about the engine central axis A. Although the vane segments 118 are shown and described with reference to application in the turbine section 28, it is to be understood that the examples herein are also applicable to structural vanes in other sections of the engine 20.

The vane segment 118 has an outer vane platform 122 radially outward of the airfoil 116. Each platform 122 has radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the outer vane platform 122 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end). In other words, the first axial side A1 is near the airfoil leading end 125 and the second axial side A2 is near the airfoil trailing end 121. The first and second circumferential sides C1, C2 of each platform 122 abut circumferential sides C1, C2 of adjacent platforms 122.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an example turbine section 28 is shown, this disclosure may apply to the compressor section. Although an outer vane platform 122 is described, this disclosure may apply to other components, and particularly flow path components. For example, this disclosure may apply to combustor liner panels, shrouds, transition ducts, exhaust nozzle liners, blade outer air seals, or other CMC components. Further, although the outer vane platform 122 is generally shown and referenced, this disclosure may apply to the inner vane platform 120.

Figure 4:
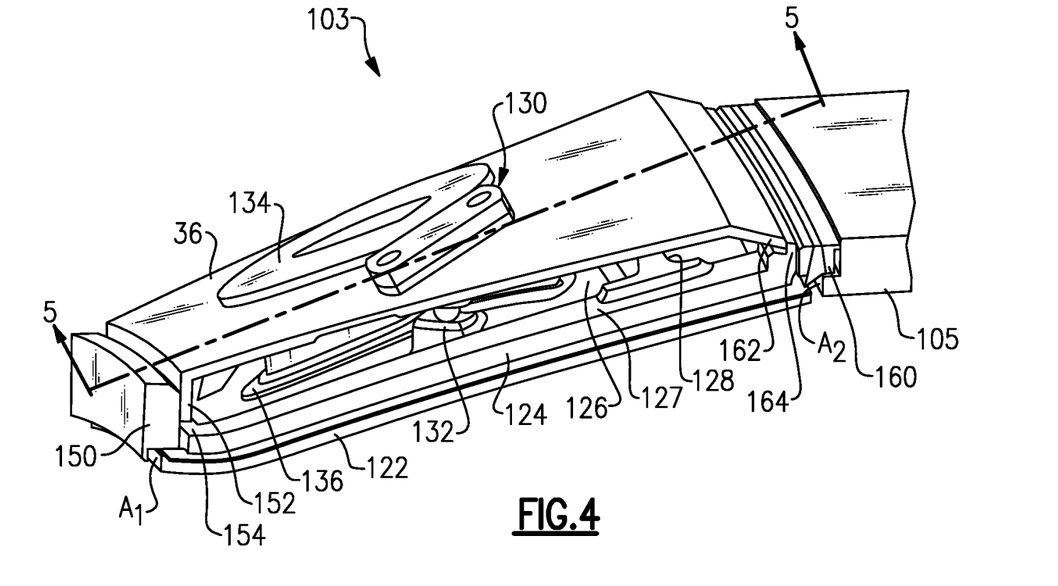
FIG. 4 schematically illustrates a view of a portion of an exemplary vane platform assembly.

FIG. 4 illustrates a sealing assembly 103 arranged at an outer vane platform 122, such as the outer vane platform 122 of the vane assembly 97. The platform 122 may be formed of a CMC material, for example. A vane support or cover 124 is arranged adjacent the platform 122. The vane cover 124 may be radially outward of the platform 122, for example. The vane cover 124 may be a metallic material, for example. An engine structure, such as engine static structure 36 is arranged radially outward of the vane cover 124 and the platform 122. One or more radially stacked components may be arranged between the platform 122 and the engine structure 36 for positioning and/or sealing the components.

The vane cover 124 may include a raised perimeter 127 that surrounds a base portion 126, for example. In this example, the raised perimeter 127 is on a radially outer side of the vane cover 124. The base portion 126 inward of the perimeter 127 may be cooled via impingement cooling, for example. A wall 128 may extend across the vane cover 124 in a circumferential direction. In this example, the wall 128 is aft of the airfoil 116. The raised perimeter 127 and wall 128 engage with other components to provide sealing between the vane cover 124 and the engine structure 36.

In some examples, the vane cover 124 has a protrusion 132 that provides a surface for engagement with a spring assembly 130. The spring assembly 130 may be secured to the engine structure 36, for example. The spring assembly 130 generally includes a spring housing 144 containing a spring 142 and a plunger 140 (shown in FIG. 5). The plunger 140 is in contact with the protrusion 132 on the vane cover 124, for example. A spring cap 146 may be arranged outward of the spring housing 144 to secure the spring 142 within the housing 144. The spring cap 16 may be secured with bolts 148, for example. The spring 142 may be a compression spring, for example. The spring assembly 130 may load the components inboard, for example.

A spar leg 134 may be secured to the engine structure 36 to provide support for an outer vane platform 122, for example. A metallic baffle 136 may be arranged on the vane cover 124 about the airfoil 116. In some examples, forward and aft seals 150, 160 are arranged forward and aft of the vane cover 124, respectively. The forward and aft seals 150, 160 may be brush seals, for example. The forward and aft seals 150, 160 are arranged at the leading edge and trailing edge, respectively, and may reduce unnecessary tangential gaps resulting from segmented seals and reduce potential leakage to the gaspath from the platform impingement region by reducing the overall number of leak paths to the gaspath. In the illustrated example, the trailing edge seal 160 also seals with the blade outer air seal 105, and thus serves a dual-purpose.

Figure 5:
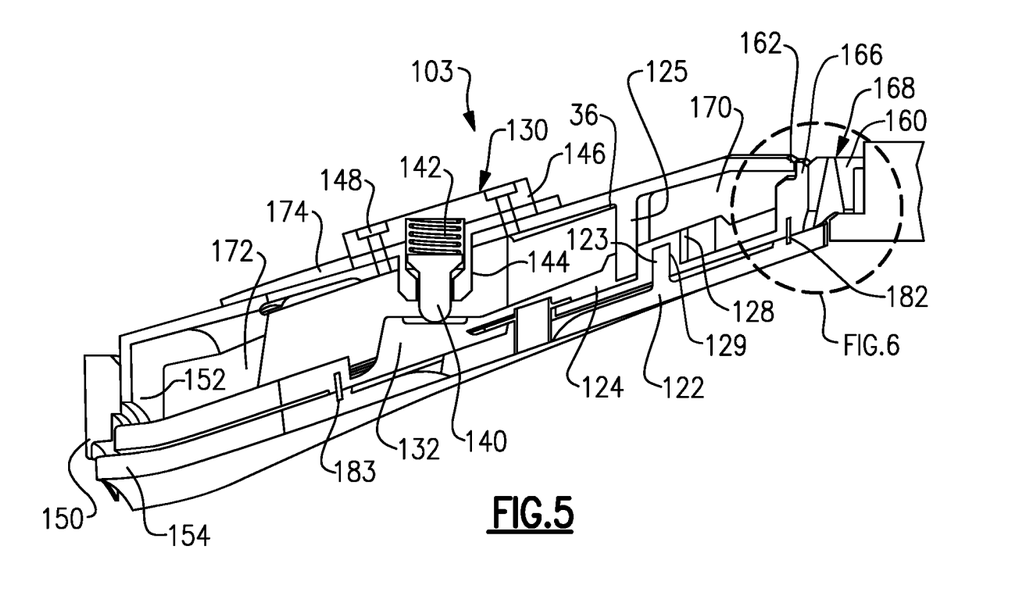
FIG. 5 schematically illustrates a cross-sectional view of an exemplary vane platform assembly taken along line 5-5 of FIG. 4.

FIG. 5 illustrates a cross-sectional view along line 5-5 of FIG. 4. This view shows the wall 128 defining a pocket or slot 129. The slot 129 extends into the wall 128 in a substantially radial direction. The platform 122 has a flange 123 that fits into the slot 129. The flange 123 extends radially outward from the platform 122 and may be integral with the platform 122, for example. In some examples, the engine structure 36 has an inwardly extending flange 125 in engagement with the wall 128. The vane cover 124 has an aft flange 164 that may engage an aft portion 162 of the engine structure. In the illustrated example, the engine structure 36 also has a forward flange 152 that extends radially inward. The forward flange 152 may engage with a forward end 154 of the vane cover 124, for example.

The wall 128 and flanges 123, 125 divide the area between the engine structure 36 and the vane cover 124 into a forward cavity 172 and an aft cavity 170. The forward and aft cavities 172, 170 are an impingement region, and provide impingement cooling to the vane cover 124 and platform 122. There is a pressure differential between a space radially outward of the cavities 172, 170, because the pressure radially outward of the engine structure 36 is higher than in the cavities 172, 170. There is also a pressure differential between the cavities 172, 170 and the gaspath and within the airfoil. The disclosed arrangement provides sealing for these cavities 172, 170 to improve impingement cooling of the components.

Figure 6:
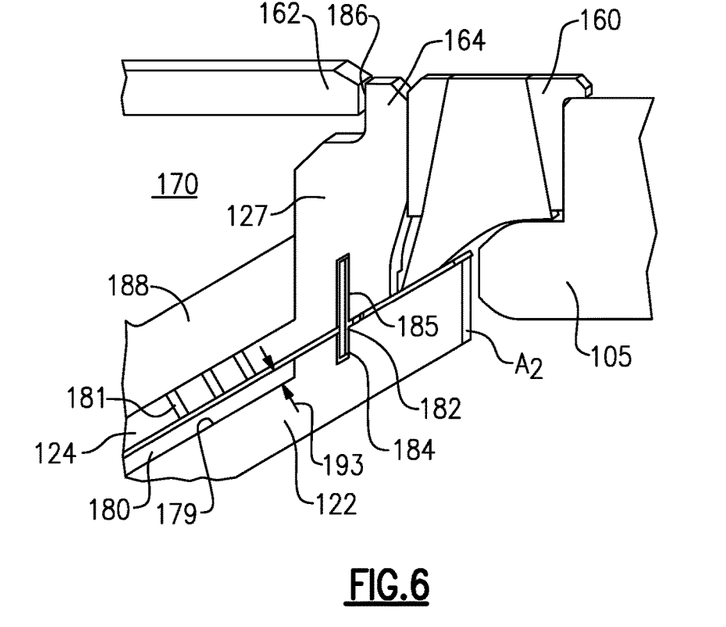
FIG. 6 schematically illustrates a portion of the example vane platform assembly.

FIG. 6 illustrates a portion of the exemplary vane identified in FIG. 5. This portion of assembly is near the trailing edge of the platform 122. In this example, a cavity or gap 180 is formed between the platform 122 and the vane cover 124. This cavity 180 may be formed as a recess in the platform 122, for example. The cavity 180 may have a height 193 between a floor 179 of the cavity 180 and the vane cover 124. In one example, the height 193 is between about 0.020 and 0.050 inches (0.508 to 1.27 mm). The cavity 180 may be formed from a local ply buildup around the perimeter of the platform 122, for example. In one example, the cavity 180 is formed by about four plies about the perimeter of the vane cover 124, though more or fewer may be used. The cavity 180 may extend in the axial direction to a same position as the base portion 126. In other words, an edge of the cavity 180 is axially aligned with the raised perimeter 127 of the vane cover 124. A plurality of impingement holes 181 extend through the vane cover 124 and communicate cooling air from the cavity 170 to the cavity 180 for impingement cooling of the platform 122.

In some examples, a slot 184 extends in a substantially radial direction into the platform 122. A slot 185 extends radially outward in the raised perimeter 127 of the vane cover 124. The slots 184, 185 are aligned in the axial direction. The slots 184, 185 may be machined into the platform 122 and vane cover 124, for example. A vertical featherseal 182 may be arranged in the slots 184, 185. The vertical featherseal 182 extends in a substantially radial direction, for example. The featherseal 182 may be a metallic material, for example. Additional vertical featherseals, such as featherseal 183 (shown in FIG. 5) may also be arranged between the platform 122 and the vane cover 124. Featherseals 182, 183 may surround a perimeter of the airfoil 116, for example. The vertical featherseal 182 may help to seal the impingement region, which may provide improved cooling effectiveness, for example.

Figure 7:
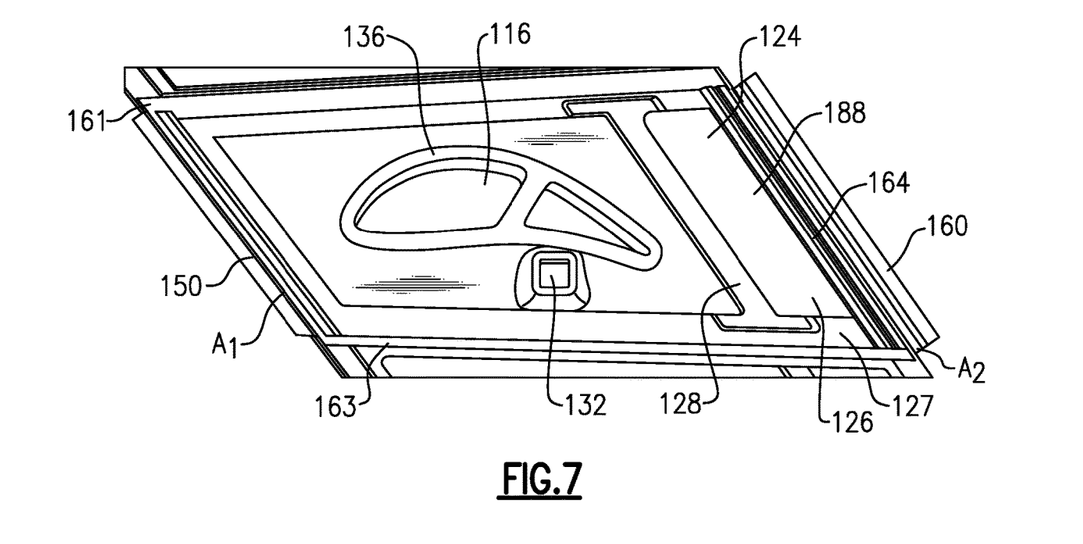
FIG. 7 schematically illustrates a portion of the example vane platform assembly.

FIG. 7 illustrates a view of a portion of the vane assembly. In this view, the outer structure 36, spar 134, and seal assembly 130 are removed to show details of the vane cover 124 and sealing arrangement. In this example, the wall 128 extends all the way across the vane cover 124 in the circumferential direction. A baffle 136 is arranged about the airfoil 116 to form an airfoil shaped cavity. The baffle 136 may be a metallic material and may be welded to the vane cover 124, for example. The baffle 136 seals off a high pressure source from the impingement region of the vane cover 124.

Mateface seals 161, 163 may be arranged along the circumferential edges of the platform 122. The mateface seals 161, 163 may be sitting directly on the platform 122, for example. The mateface seals 161, 163 extend an entire axial length of the platform 122. The mateface seals 161, 163 may be seated in place by the forward and aft seals 150, 160, for example. This arrangement having leading and trailing edge seals, such as brush seals, and pressure and suction side mateface seals around the entire perimeter of the platform 122 to restrict leakage to the gaspath.

In some examples, a coating may be applied on a portion of the platform 122. The coating may be applied at the matefaces, or circumferential sides C1, C2, for example. The coating may be machinable. For example, a step may be machined into the coating to form a recess, and the mateface seal 163 fits in the recess. This arrangement positions the mateface seal further radially inward, which may allow for improved radial clearance and cooling.

The disclosed arrangement helps to react out forces on the vane, provide effective sealing means, and provide impingement cooling. This arrangement provides an effective sealing by combining outer diameter perimeter leak paths, while preserving the ability to impinge on the platform's backside via the metallic cover plate. This arrangement also permits impingement within internal airfoil cavities via the baffle of the CMC cover. The arrangement allows the number, position, and size of flanges to vary based on the loading needs of a particular design. The arrangement ensures the impingement regions are segregated from the source pressure regions by utilizing vertical featherseals and allowing the baffles to be welded to the metallic cover. The metallic cover further maximizes the potential area coverage of backside platform impingement by eliminating spatially inhibiting features. The metallic cover and spring assembly further allow the backside platform impingement distance to be more precisely controlled by reducing the number of constituent dimensions in the tolerance stackup. Some known radially stacked assemblies have a large gap from the accumulated tolerances of each component. The disclosed spring assembly may ensure the components are biased inward and properly constrained. In engine operation, the pressure difference within the assembly exerts a force on the outboard side of the vane cover 124 and platform 122 to also aid in loading the components inboard. The trailing edge sealing arrangement may have several beneficial attributes, such as BOAS cooling flow metering.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A vane assembly, comprising:
an airfoil extending from a platform, the platform having a flange extending radially outward and circumferentially across the platform; and
a vane cover arranged adjacent the platform that defines an impingement gap between the platform and the vane cover, the vane cover having a wall that defines a slot, the flange arranged at least partially within the slot; and
wherein the vane cover has a protrusion that provides a seal land and is configured to be in contact with a plunger of a spring assembly mounted on an engine static structure.

2. The vane assembly of claim 1, wherein the wall extends circumferentially across the vane cover.

3. The vane assembly of claim 1, wherein the wall is configured to engage with a radially inwardly extending flange of an engine static structure.

4. The vane assembly of claim 1, wherein a plurality of holes extend through the vane cover and are in fluid communication with the impingement gap.

5. The vane assembly of claim 1, wherein the impingement gap is between about 0.020 and 0.050 inches (0.508-1.27 mm).

6. The vane assembly of claim 1, wherein the vane cover has a raised perimeter on a radially outer side.

7. The vane assembly of claim 6, wherein a second slot is arranged in a portion of the raised perimeter, and a vertical featherseal is arranged in the second slot.

8. The vane assembly of claim 1, wherein a mateface seal is arranged on the platform at a circumferential edge.

9. The vane assembly of claim 1, wherein a brush seal is arranged along at least one of a forward end and an aft end of the platform.

10. The vane assembly of claim 1, wherein a baffle is welded to the vane cover to seal an airfoil shaped cavity.

11. The vane assembly of claim 1, wherein the platform is formed from a ceramic matrix composite material.

12. The vane assembly of claim 1, wherein the vane cover is formed from a metallic material.

13. A gas turbine engine, comprising:
a compressor section;
a combustor in fluid communication with the compressor section; and
a turbine section in fluid communication with the combustor,
at least one of the turbine section or the compressor section comprising:
a vane having an airfoil and a platform, the platform having a flange extending radially outward and circumferentially across the platform;
a vane cover arranged adjacent the platform, the vane cover having raised perimeter on a radially outer side, the vane cover defines an impingement gap between the platform and the vane cover within the raised perimeter;
wherein a wall extends circumferentially across the vane cover, the wall defines a slot, and the flange of the platform is arranged within the slot; and
wherein the wall is engaged with a first flange that extends radially inwardly from an engine static structure.

14. The gas turbine engine of claim 13, wherein the engine static structure has a second radially inwardly extending flange forward of the first flange.

15. The gas turbine engine of claim 13, wherein a plurality of holes extend through the vane cover and are in fluid communication with the impingement gap.

16. The gas turbine engine of claim 15, wherein the platform comprises a ceramic matrix composite material, and the vane cover comprises a metallic material.

17. The gas turbine engine of claim 13, wherein the platform is formed from a ceramic matrix composite material, and the vane cover is formed from a metallic material.

18. The gas turbine engine of claim 13, further comprising:
a spring assembly mounted to the engine static structure and including a plunger; and
wherein the vane cover has a protrusion that provides a seal land, and the plunger is configured to contact the seal land.

19. The gas turbine engine of claim 13, wherein:
the vane cover has a raised perimeter on a radially outer side, and the raised perimeter includes a second slot; and
a vertical featherseal is arranged in the second slot.

20. The gas turbine engine of claim 13, wherein a brush seal is arranged along at least one of a forward end and an aft end of the platform relative to an engine longitudinal axis.

21. The gas turbine engine of claim 13, wherein a baffle is welded to the vane cover to seal an airfoil shaped cavity.

22. A gas turbine engine comprising:
a compressor section;
a combustor in fluid communication with the compressor section; and
a turbine section in fluid communication with the combustor,
at least one of the turbine section or the compressor section comprising:
a vane having an airfoil and a platform, the platform having a flange extending radially outward and circumferentially across the platform;
a vane cover arranged adjacent the platform, the vane cover having raised perimeter on a radially outer side, the vane cover defines an impingement gap between the platform and the vane cover within the raised perimeter;
wherein a wall extends circumferentially across the vane cover, the wall defines a slot, and the flange of the platform is arranged within the slot; and
wherein a mateface seal is arranged on the platform at a circumferential edge and a brush seal is arranged along at least one of a forward end and an aft end of the platform.

* * * * *